(12) United States Patent
Abdul et al.

(10) Patent No.: US 11,761,478 B2
(45) Date of Patent: Sep. 19, 2023

(54) CONTACT LAYER ON THE SURFACE OF A METAL ELEMENT IN RELATIVE MOVEMENT AGAINST ANOTHER METAL ELEMENT AND AN ARTICULATION JOINT PROVIDED WITH SUCH A CONTACT LAYER

(71) Applicants: AKTIEBOLAGET SKF, Gothenburg (SE); SKF AEROSPACE FRANCE S.A.S., Montigny-le-Bretonneux (FR)

(72) Inventors: Azeez Abdul, Utrecht (NL); Camille Dayot, Valence (FR); Christine Matta, Utrecht (NL); Pei Rose Yan, Houten (NL); Xiaobo Zhou, Houten (NL)

(73) Assignees: AKTIEBOLAGET SKF, Gothenburg (SE); SKF AEROSPACE FRANCE S.A.S, Montigny-le-Bretonneux (FR)

( * ) Notice: Subject to any disclaimer, the term of this patent is extended or adjusted under 35 U.S.C. 154(b) by 512 days.

(21) Appl. No.: 16/905,540

(22) Filed: Jun. 18, 2020

(65) Prior Publication Data

US 2020/0408243 A1    Dec. 31, 2020

(30) Foreign Application Priority Data

Jun. 25, 2019 (FR) ...................................... 1906881

(51) Int. Cl.
*C22C 9/06* (2006.01)
*F16C 11/06* (2006.01)

(52) U.S. Cl.
CPC ............ *F16C 11/0628* (2013.01); *C22C 9/06* (2013.01); *F16C 11/0614* (2013.01)

(58) Field of Classification Search
CPC ......... C22C 9/06; C23C 6/00; F16C 11/0614; F16C 2202/04; F16C 33/121; F16C 33/14
(Continued)

(56) References Cited

U.S. PATENT DOCUMENTS 6,060,179 A * 5/2000 Tsuji ..................... B32B 15/013
428/941
2009/0154990 A1    6/2009 Julliere
(Continued)

FOREIGN PATENT DOCUMENTS

CN    1828075 A    9/2006
EP    1431597 A1    6/2004
(Continued)

OTHER PUBLICATIONS

Search report from the British Patent Office dated Aug. 25, 2020 in related application No. GB2004230.5.
(Continued)

*Primary Examiner* — Jie Yang
(74) *Attorney, Agent, or Firm* — J-TEK LAW PLLC; Scott T. Wakeman; Mark A. Ussai

(57) ABSTRACT

A contact layer is formed by a deposition method on an inner surface of a first metal element by a centrifuging process, and preferably includes an inner layer of copper alloy and an outer layer of tin alloy. Such a contact layer is used in an articulation joint including a first metal element having a surface provided with the contact layer, and a second metal element with a second surface. The first and second elements are relatively movable such that first and second surfaces slide against each other.

4 Claims, 2 Drawing Sheets

(58) Field of Classification Search
USPC .......................................................... 420/89
See application file for complete search history.

(56) References Cited

U.S. PATENT DOCUMENTS

2018/0209017 A1   7/2018   Buerkle et al.
2019/0366402 A1   12/2019  Nozaki et al.

FOREIGN PATENT DOCUMENTS

| EP | 2048389 A2 | 4/2009 |
| FR | 2907468 A1 | 4/2008 |
| GB | 523896 A | 7/1940 |
| GB | 1202856 A | 8/1970 |
| GB | 2175354 A | 11/1986 |
| JP | S586765 A | 1/1983 |
| RU | 2005108104 A | 9/2006 |
| SU | 529898 A1 | 9/1976 |
| WO | 2018147370 A1 | 8/2018 |

OTHER PUBLICATIONS

Preliminary Search Report from the French Patent Office dated Jan. 8, 2020 in related French application No. FR1906881, including Search Report and Written Opinion.

\* cited by examiner

[Fig 1]
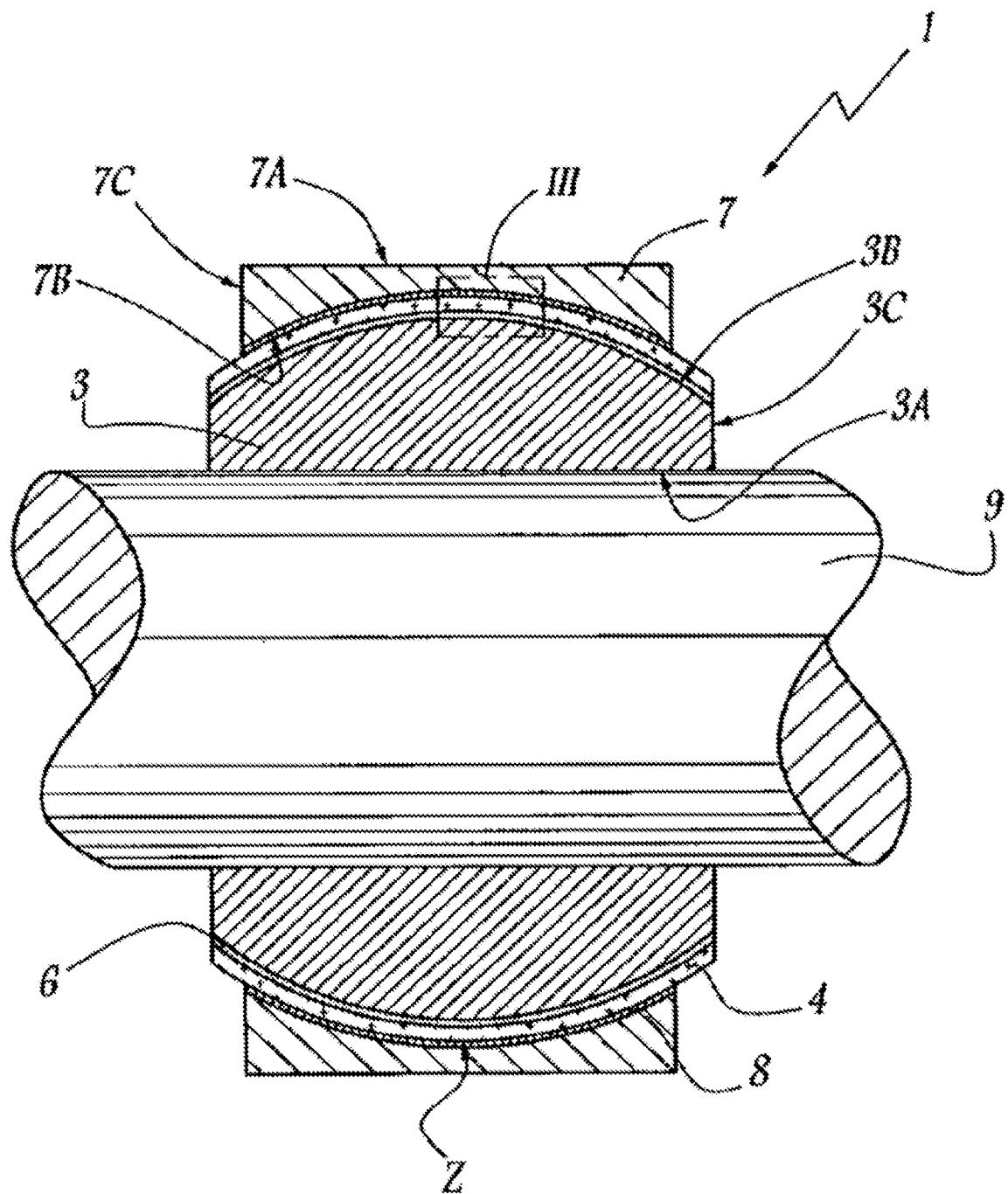

[Fig 2]
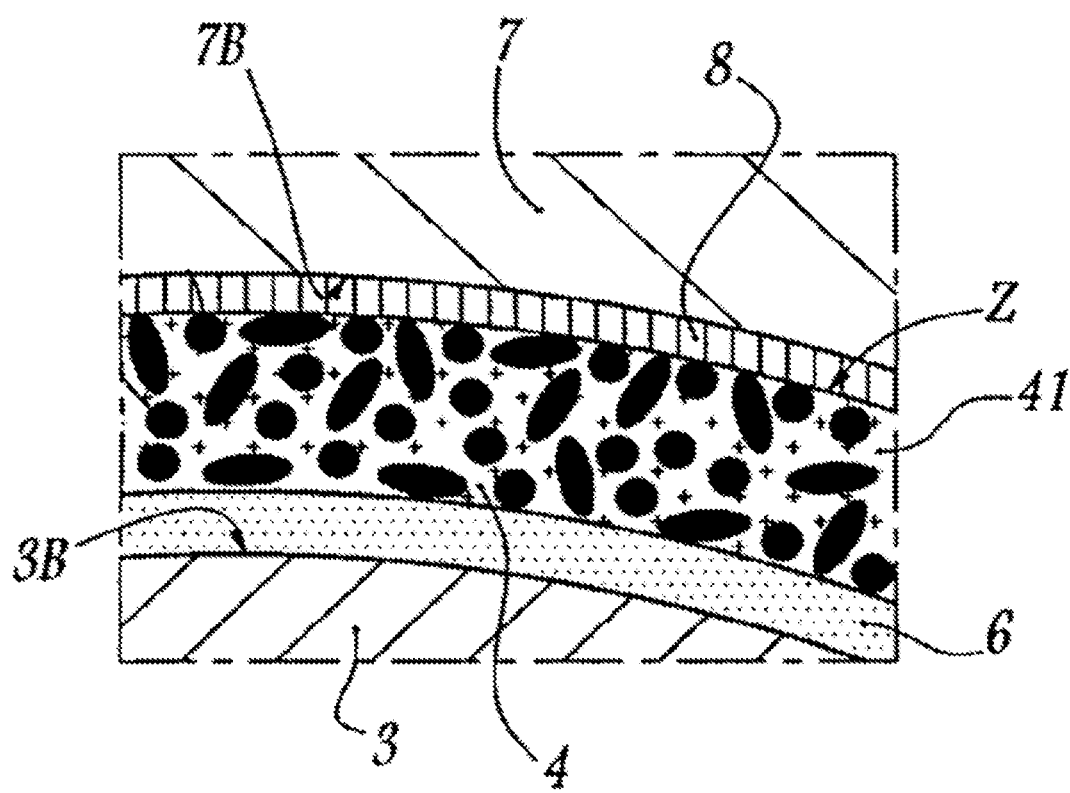

CONTACT LAYER ON THE SURFACE OF A METAL ELEMENT IN RELATIVE MOVEMENT AGAINST ANOTHER METAL ELEMENT AND AN ARTICULATION JOINT PROVIDED WITH SUCH A CONTACT LAYER

CROSS-REFERENCE

This application claims priority to French Patent Application No. 1906881 filed on Jun. 25, 2019, the entire contents of which are fully incorporated herein by reference.

BACKGROUND OF THE INVENTION

The present invention relates to a contact layer applied to the surface of a metal element which is in relative movement against another metal element.

The present invention relates to a contact layer or a combination of contact layers applied to the articulation links that are of ball joint type. The invention is of particular benefit to applications in the aeronautical field, for which the use of alloys such as the titanium alloys, the nickel alloys, or certain types of steel are necessary, because of their mechanical temperature, fatigue, weight-saving properties, but also because of their limited life span.

In the aeronautical industry, it is known practice to use a metal ball joint in order to immobilize two members, such as a connecting rod and a structural part, translationally relative to one another, while allowing a relative rotational movement of these members.

Such a ball joint, described for example in EP 1 431 597, typically comprises a metal internal ring and a metal external ring. An inner surface of the internal ring is adapted to be mounted on a shaft, while its outer surface is substantially spherical and capable of cooperating with a corresponding inner surface of the external ring. The internal ring and the external ring thus have three degrees of mutual freedom in rotation, while being subject to one another in translation. The internal ring can be composed of two joined elements, each having a C shape in transverse cross section.

In order to obtain a lightweight metal ball joint, it is advantageous to form the internal and external rings of a metal or a metal alloy having low density, particularly titanium and titanium alloys. In certain applications, it may be required to produce the internal and external rings in nickel alloys or certain steel grades to guarantee a satisfactory mechanical strength. However, the tribological properties of these metals make it difficult to prevent wear of the articulation members under dynamic loading with relative movements between the internal and external rings, or between the internal ring and the shaft.

To mitigate this problem, it is a known practice to provide coatings to protect the contact surfaces of the ball joint, as described for example in FR 2 907 468 and EP 2 048 389. Thin coatings, of high hardness, can be applied onto a first contact surface by vapor phase deposition (VPD). Thick coatings of copper alloys, exhibiting a lesser hardness and a sacrificial wear behavior compared to the VPD layers, can be applied to a second contact surface.

However, coatings obtained by thermal spraying generally have a relatively small thickness, for example of about 150 μm to 250 μm after finishing, a reduced adhesion, which creates a risk of scaling, and a limited cohesion, causing a significant rate of wear, limiting the lifespan of the articulations and the loading capacity of such articulations.

Moreover, the application of coatings by a thermal spraying method on inner surfaces of relatively lesser diameters is not generally possible without affecting the quality of the coating. Because of this constraint, the external ball joint ring is generally coated by a VPD method and the spherical surface of the internal ring is generally coated by a thermal spraying method. This configuration is not optimal from a mechanical point of view. In fact, a coating exhibiting sacrificial wear behavior should be applied onto the surface of smaller kinematic length, thus making it possible to maintain conformity of contact despite the wear thereof.

Finally, the limitations of the thermal spraying methods also dictate the use of a tubular bearing of bronze alloy, inserted between the internal ring and the shaft to prevent the wear between these two surfaces.

SUMMARY OF THE INVENTION

The present invention aims to remedy these abovementioned drawbacks. More particularly, the present invention aims to provide a contact layer applied to the surface of a metal element in relative movement against another metal element, for example, applied to a surface of an articulation link system such as a ball joint, offering a stable behavior and an improved life span for increased load capacities.

The present invention relates to a contact layer applied to an inner surface of a first metal element intended to be in relative movement against a surface of a second metal element, the layer being formed by a method comprising the following successive steps:
- introduction and fixing of the metal element in a cylindrical mold, an inner surface having to receive the layer being free from the interior of the mold;
- introduction of the material having to form the layer into the mold;
- rotation of the mold with progressive increasing of speed, the impregnation of the surface being done under the effect of centrifugal force;
- hardening of the layer and cooling of the element;
- extraction of the element from the mold.

Under the process of the present invention, the contact layer is deposited on the inner surface of the metal element by centrifugal casting. The process does not affect the base metal material of the element, such as a ring, whether the layer is deposited on the surface of the element or on an inner layer.

Another advantage of the present method is the capability of applying a layer of defined thickness, which can be relatively thick in comparison with layers applied by other known methods. Thus, it is possible to machine a portion, for example a groove, directly on the contact layer, while the element remains covered by the contact layer (i.e., the machined portion does not extend to the base surface of the element). As such, it is no longer necessary to machine a desired portion first and then apply the contact layer, the thickness of the contact layer within the machined portion being generally poorly controlled using previously known methods.

The method according to the present invention also provides better chemical adhesion between the formed contact layer and the base metal material of the surface of the ring, thus reducing the risk of delamination of the contact layer.

The contact layer deposited by centrifuging has better cohesion through an enhanced metallurgical continuity of the grains, thus improving the wear resistance of the layer. It is also possible to grade the composition of the material forming the contact layer according to the desired application, with a standardized ring.

Finally, the inner surface of the metal element may be covered with a contact layer formed of a material chosen specifically for a relative movement against a surface of another metal element, and the other surface may also be covered with a contact layer, which may be formed similarly to the contact layer.

According to other advantageous but non-mandatory features of the invention, such a contact layer is formed of a copper alloy, the copper content of which is 50% by weight to 90% by weight, and can also include the following features, taken alone or in any technically feasible combination:

- The layer further comprises other elements, including aluminum, the content of which is 5% to 15% by weight, nickel, the content of which is 2% to 8% by weight, and iron, the content of which is 1 to 7% by weight.
- The contact layer is a copper alloy, the copper content of which is 70% to 90% by weight, and comprising other elements, including nickel, the content of which is 10% to 20% by weight, and tin of a content of between 5% and 12% by weight.
- The contact layer has a surface hardness of between 50 HB and 400 HB, and advantageously between 150 HB and 300 HB.
- The contact layer has a thickness of between 20 μm and 2000 μm, and advantageously between 100 μm and 300 μm.

According to other advantageous but non-mandatory features of the present invention, such a contact layer is formed of a tin alloy, the tin content of which is 75% to 95% by weight, and can also include the following features, taken alone or in any technically feasible combination:

- The contact layer further comprises other elements such as antimony, the content of which is 5% to 15% by weight, and copper of a content of between 2% and 10% by weight.
- The contact layer has a surface hardness of between 20 HB and 40 HB.
- The contact layer has a thickness of between 50 μm and 300 μm.

According to other advantageous but non-mandatory features of the invention, The contact layer comprises a bottom or inner, first layer formed of a copper alloy according to any one of the preceding embodiments, and a top or outer, second layer applied to the first layer, and formed of a tin alloy according to any one of the preceding embodiments, and can also include the following features, taken alone or in any technically feasible combination:

- The bottom, first layer has a thickness of between 100 μm and 300 μm.
- The top, second layer has a thickness of between 2 μm and 20 μm.

The invention relates also to an articulation part comprising a first metal element with an inner surface provided with a first contact layer according to one of the preceding embodiments, and a second metal element with a second surface, the first and second elements being in relative movement by sliding contact between the first and second surfaces.

According to other advantageous but non-mandatory features of the invention, the articulation part can also include the following features, taken alone or in any technically feasible combination:

- The first and second elements are formed of titanium alloy.
- The first and second elements are formed of nickel alloy.
- The first and second elements are formed of steel.
- The second surface of the second element is not provided with an additional coating.
- The second surface of the second element is provided with a second contact layer of a hardness greater than the first contact layer of the first surface of the first element.
- The second layer has a dry slip friction coefficient less than 0.5, and preferably less than 0.2.
- The second layer has a lubricated slip friction coefficient less than 0.2, and preferably less than 0.12.

According to other advantageous but non-mandatory features of the invention, the second contact layer is deposited by a thermal spraying method on the second surface of the second element, in particular by plasma spraying, by high velocity oxy-fuel ("HVOF") spray coating, or by cold spraying, and can also include the following features taken alone or in any admissible combination:

- The second contact layer comprises tungsten carbide, the content of which is 50% to 90% by weight.
- The second contact layer also comprises cobalt, the content of which is 5% to 25% by weight.
- The second contact layer comprises other elements such as chromium, the content of which is between 0% and 10% by weight, and/or nickel, the content of which is between 0% and 30% by weight.
- The second contact layer has a surface hardness of between 500 HB and 2000 HB, and preferably between 800 HB and 1500 HB.
- The second contact layer has a thickness of between 10 μm and 2000 μm, and preferably between 50 μm and 200 μm.

According to other advantageous but non-mandatory features of the invention, the second contact layer is deposited by a gaseous phase condensation method or physical vapor deposition" ("PVD"), and can also include the following features taken alone or in any feasible combination:

- The second contact layer consists of a carbon coating of diamond type, diamond-like carbon or ("DLC").
- The second contact layer of DLC further includes additional metal.
- The metal can be tungsten, titanium, silicone, or nickel.
- The concentration of the metal is between 3% and 20% by weight.
- The second contact layer of DLC has a surface hardness of between 800 HB and 5000 HB, and advantageously between 1200 HB and 2500 HB.
- The second contact layer of DLC has a thickness of between 1 μm and 20 μm, and preferably between 2 μm and 5 μm.
- Alternatively, the second contact layer comprises chromium nitride.
- The second contact layer of chromium nitride has a surface hardness of between 100 HB and 2800 HB, and advantageously between 1500 HB and 2300 HB.
- The second contact layer of chromium nitride has a thickness of between 1 μm and 50 μm, and preferably between 5 μm and 25 μm.
- Alternatively, the second contact layer comprises a bottom first layer formed of a metal, and a top second layer, applied to the first layer and composed of DLC.
- The bottom, first layer comprises chromium nitride.
- The bottom, first layer consists of a metal link layer comprising chrome, titanium, or silicone, of a thickness of between 0.02 μm and 5 μm, and advantageously between 0.1 μm and 1 μm.

According to another advantageous but non-mandatory aspect of the invention, the articulation part according to any one of the preceding embodiments consists of a ball joint, and can include the following features taken alone or in any technically feasible combination:

The first element consists of an external ring, with an inner surface provided with a first contact layer according to any one of the preceding embodiments.

The second element consists of an internal ring, with an outer surface provided with a second contact layer according to any one of the preceding embodiments.

The inner and outer surfaces are spherical.

The inner ring is provided with a central bore.

The central bore is provided with a contact layer according to any one of the preceding embodiments.

The central bore is provided with a bearing.

The bearing is made of bronze.

The bearing is provided with an inner cylindrical surface provided with a contact layer according to any one of the preceding embodiments.

BRIEF DESCRIPTION OF THE SEVERAL VIEWS OF THE DRAWING FIGURES

The invention will be better understood on reading the following description given purely as a nonlimiting example. The description is given with reference to the attached drawings in which:

FIG. 1 is a transverse cross section of a ball joint according to an embodiment of the invention, mounted on a shaft; and FIG. 2 is a larger scale schematic view of the detail III of FIG. 1.

DETAILED DESCRIPTION OF THE INVENTION

FIG. 1 shows an articulation part of ball-type joint 1, the ball joint 1 comprising an internal ring 3 and an external ring 7. The internal and external rings 3, 7, respectively, are each composed of a titanium alloy, for example of TA6V type. Alternatively, the two rings 3, 7 may each be composed of a nickel alloy or of steel.

The external ring 7 has a substantially cylindrical outer surface 7A, a spherical or partially spherical inner surface 7B, more specifically in the form of sphere sections, which is connected to the outer surface 7A by lateral walls 7C.

The internal ring 3 has a substantially cylindrical inner surface 3A, which is designed to be disposed about the outer periphery of a corresponding cylindrical shaft 9. The internal ring 3 also has an outer surface 3B having a spherical profile, more specifically in the form of sphere sections, corresponding or complementary to that of the inner surface 7B of the external ring 7. Thus, the internal ring 3 and the external ring 7 each have, relative to one another, three degrees of rotational freedom. The inner surface 3A and the outer surface 3B of the internal ring 3 are connected to each other by lateral walls 3C. These lateral walls 3C of the internal ring 3 protrude, in axial cross section, on either side of the lateral walls 7C of the external ring 7 in the position depicted in FIG. 1, in which the cylindrical surface 7A of the external ring 7 is coaxial with the shaft 9. Although not depicted, the internal ring 3 may also have a cylindrical sleeve fitted between the ring inner surface 3A and the outer periphery of the shaft 9. Such a sleeve may be formed, for example, of bronze or another appropriate material.

The ball joint 1 also comprises a first contact layer 8 and a second contact layer 4 deposited respectively on the spherical surfaces 7B, 3B of the external ring 7 and the internal ring 3, respectively. Specifically, the first contact layer 8 is deposited on the inner surface 7B so as to form part of the external ring 7 and provides the contact surface of the external ring 7, which is intended to cooperate with the internal ring 3 within an interface or cooperation zone Z. Likewise, the second contact layer 4 is deposited on the outer surface 3B so as to form part of the internal ring 3 and provides the contact surface of the internal ring 3, and is intended to cooperate with the external ring 7 in the interface/cooperation zone Z.

The contact layers 4 and 8 each have specific properties adapted to improve the friction coefficient at the interface Z between the internal ring 3 and the external ring 7. More specifically, the second contact layer 4, which is provided on the outer surface 3B of the internal ring 3, preferably has a hardness greater than the hardness of the first contact layer 8 on the inner surface 7B of the external ring 7.

Preferably, the second contact layer 4 provided on the outer surface 3B of the internal ring 3 has a dry slip friction coefficient of less than 0.5, most preferably less than 0.2, and a lubricated slip friction coefficient of less than 0.2, most preferably less than 0.12.

According to a first embodiment (not depicted), the second contact layer 4 on the outer surface 3B of the internal ring 3 is deposited by a thermal spraying method on the second or outer surface 3B of the second element or internal ring 3, in particular by plasma spraying, by high velocity oxy-fuel ("HVOF") spray coating, or by cold spray.

The second contact layer 4 comprises tungsten carbide, the content of which is about fifty percent (50%) by weight to about ninety percent (90%) by weight. The second contact layer 4 may also comprise cobalt, the content of which is about five percent (5%) by weight to about twenty-five percent (25%) by weight, and may also include other elements such as chromium, the content of which may between about zero percent (0%) by weight and about ten percent (10%) by weight, and/or nickel, the content of which may be between about zero percent (0%) by weight and about thirty percent (30%) by weight.

According to this first embodiment, the second contact layer 4 has a surface hardness of between 500 HB (i.e., Brinell hardness number) and 2000 HB, preferentially between 800 HB and 1500 HB, and has a thickness of between ten micrometers (10 μm) and two thousand micrometers (2000 μm), preferably between 50 μm and 200 μm.

According to a second embodiment, the second contact layer 4 is preferably deposited on the internal ring 3 by a gaseous phase condensation method, or physical vapor deposition ("PVD").

According to a first variant of the second embodiment (not shown), the second contact layer 4 consists of a carbon coating of a diamond type, or diamond-like carbon ("DLC"). The second contact layer 4 formed of DLC may further comprise additional metal(s), such as tungsten, titanium, silicone, or nickel, the concentration of which may be between about three percent (3%) by weight and about twenty percent (20%) by weight.

According to this variant, the second contact layer 4 of DLC has a surface hardness of between 800 HB and 5000 HB, preferably between 1200 HB and 2500 HB, and has a thickness of between one micrometer (1 μm) and twenty micrometers (20 µm), preferably between two micrometers (2 µm) and five micrometers (5 µm).

According to a second variant of this second embodiment that is not illustrated, the second contact layer 4 comprises chromium nitride. The second contact layer 4 has a surface hardness of between about 100 HB and about 2800 HB, preferably between about 1500 HB and about 2300 HB, and has a thickness of between one micrometer (1 µm) and about fifty micrometers (50 µm), preferably between 5 µm and 25 µm.

According to a third variant of this second embodiment shown in FIG. 2, the second contact layer 4 comprises a bottom or inner, first layer 6 comprising a metal, and a top or outer, second layer 41 applied to the first layer 6, and composed of DLC. For example, the bottom or inner first layer 6 can comprise chromium nitride, or the bottom first layer 6 may consist of a metal link layer comprising chromium, titanium, or silicone, of a thickness of between 0.02 µm and 5 µm, and advantageously between 0.1 µm and 1 µm.

According to a third embodiment that is not illustrated, the outer surface 3B of the internal ring 3 is not provided with a contact layer, the base material of the internal ring 3 being in direct contact with the contact layer 8 on the inner surface 7B of the external ring 7.

According to the present invention, the first contact layer 8 is deposited on the inner surface 7B of the external ring 7 according to a method comprising the following steps:
  introducing and fixing or retaining the external metal ring 7 within a cylindrical mold, the inner surface 7B for receiving the contact layer 8 being free from, i.e., spaced from, the interior of the mold;
  introducing the material used to form the contact layer 8 into the mold;
  rotating the mold with progressively increasing rotational speed, such that the impregnation of the surface 7B is accomplished under the effect of centrifugal force; that is, the alloy material is impregnated on the surface 7B by centrifugal force;
  hardening the layer 8 and cooling the external ring 7; and
  extracting or removing the external ring 7 from the mold.

According to a first embodiment of the present invention, such a contact layer 8 is a copper alloy, preferably having a copper content of between about fifty percent (50%) by weight and about ninety percent (90%) by weight.

The first layer 8 can further comprise other elements, including aluminum, the content of which may be between about five percent (5%) by weight and fifteen percent (15%) by weight, nickel, the content of which may be between about two percent (2%) by weight and about eight percent (8%) by weight, and iron, the content of which may be between about one percent (1%) by weight and seven percent (7%) by weight.

Alternatively, the first contact layer 8 may be a copper alloy, the copper content of which is between about seventy percent (70%) by weight and about ninety percent (90%) by weight, and comprising other elements, including nickel, the content of which is between about ten percent (10%) by weight and about twenty percent (20%) by weight, and tin of a content between about five percent (5%) by weight and twelve percent (12%) by weight. As another alternative, the contact layer 8 is a copper alloy, the copper content of which is between about seventy percent (70%) by weight and about ninety percent (90%) by weight, and comprising other elements, including nickel, the content of which is between about thirty percent (30%) by weight and about forty percent (40%) by weight, and indium, the content of which is about two percent (2%) by weight and about eight percent (8%) by weight. According to yet another alternative, the contact layer is a copper alloy, the copper content of which is about seventy percent (70%) by weight and about ninety percent (90%) by weight, and comprising other elements, including aluminum, the content of which is between about five percent (5%) by weight and about fifteen percent (15%) by weight, iron, with a content substantially equal to about (1%) by weight, and graphite.

According to this first embodiment, the contact layer 8 has a surface hardness of between 50 HB and 400 HB, preferably between 150 HB and 300 HB, and has a thickness of between twenty micrometers (20 µm) and two thousand micrometers (2000 µm), preferably between 100 µm and 300 µm.

According to a second embodiment, the contact layer 8 is a tin alloy, the tin content of which is between seventy-five percent (75%) by weight and about ninety-five percent (95%) by weight. The contact layer 8 can also comprise other elements such as antimony, the content of which is five percent (5%) by weight and about fifteen percent (15%) by weight, and copper, the content of which is between about two percent (2%) by weight and about ten percent (10%) by weight.

According to this second embodiment, the contact layer 8 has a surface hardness of between 20 HB and about 40 HB, and has a thickness of between about fifty micrometers (50 µm) and about three hundred micrometers (300 µm).

According to a third embodiment (not depicted), the contact layer 8 on the external ring 7 comprises a bottom or inner, first layer formed of a copper alloy according to any one of the above-described embodiments, and a top or outer, second layer applied to the first layer and formed of a tin alloy according to any one of the above-described embodiments. The bottom or inner, first layer is preferably formed of a copper alloy with a copper content of about fifty percent (50%) by weight and ninety percent (90%) by weight and has a thickness of between about one hundred micrometers (100 µm) and about three hundred micrometers (300 µm). The top or outer, second layer is formed of a tin alloy and preferably has a thickness of between about two micrometers (2 µm) and about twenty micrometers (20 µm).

Further, the bottom or inner, first layer is preferably formed of a copper alloy in a process that includes the following steps:
  introducing and fixing the first metal element (e.g., the external ring 7) in a cylindrical mold, the surface 7B receiving the first layer of copper alloy being spaced from the interior of the mold;
  introducing the material for forming the first layer of copper alloy into the mold;
  rotating the mold with progressively increasing rotational speed such that the copper alloy material is impregnated on the surface of the first metal element/ring 7 by centrifugal force;
  hardening the layer of copper alloy and cooling the first metal element/ring 7; and
  extracting the first metal element/ring from the mold; and Furthermore, the top or outer, second layer is preferably formed of a tin alloy in a process that includes the following steps:
  introducing and fixing the first metal element (e.g., the ring 7) with the first layer into a cylindrical mold, the surface for receiving the second layer of tin alloy being spaced from the interior of the mold;
  introducing the material for forming the second layer of tin alloy into the mold;

rotating the mold with progressively increasing rotational speed such that the tin alloy material is impregnated on the surface of the first metal element by centrifugal force;

hardening the second layer of tin alloy and cooling the first metal element; and extracting of the first metal element from the mold.

Furthermore, the technical features of the different embodiments can be, wholly and only for some of them, combined with one another. Thus, the ball joint can be adapted in terms of costs, performance, and simplicity of implementation.

The present invention has been described for an articulation part of ball joint type as an exemplary embodiment. The present invention can be applied to any type of articulation part, and more generally to any device comprising a first metal element with a first surface, and a second metal element with a second surface, the two elements being in relative contact movement.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved contact layers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A method of forming a contact layer on a surface of a first metal element, the surface being intended to be slidable against a surface of a second metal element, the method comprising the steps of:

providing a copper alloy, a tin alloy and the first metal element formed of titanium or a titanium alloy and having an inner surface;

inserting the first metal element into a mold without removal of oxidation from the inner surface such that the surface is spaced from the interior of the mold;

introducing the copper alloy into the mold;

rotating the mold such that the copper alloy is impregnated on the surface of the first element by centrifugal force to form a first layer on the surface;

hardening the first layer on the first element;

introducing the tin alloy into the mold;

rotating the mold such that the tin alloy is impregnated on the first layer by centrifugal force to form a second, outer layer; and hardening the second layer on the first layer.

2. The method of claim 1, wherein the step of providing the copper alloy includes providing a copper alloy having a copper content of between fifty percent (50%) by weight and ninety percent (90%) by weight.

3. The method of claim 1 further comprising the step of extracting the first metal element from the mold prior to the step of introducing the tin alloy into the mold.

4. The method of claim 1 wherein the first layer has a thickness of between one hundred micrometers (100 μm) and three hundred micrometers (300 μm) and the second layer has a thickness between two micrometers (2 μm) and twenty micrometers (20 μm).

* * * * *